Dec. 24, 1957   D. G. SHIGLEY   2,817,601
METHOD OF IMPREGNATING A POROUS METAL ARTICLE
Filed May 25, 1953

INVENTOR.
DONALD G. SHIGLEY
BY
HIS ATTORNEY

2,817,601

METHOD OF IMPREGNATING A POROUS METAL ARTICLE

Donald G. Shigley, Dayton, Ohio, assignor to General Motors Corporation, Detroit, Mich., a corporation of Delaware Application May 25, 1953, Serial No. 357,181

2 Claims. (Cl. 117—131)

This invention relates to impregnation processes and is particularly directed to the impregnation of porous ferrous parts with a cupreous material.

It is one of the objects of the invention to provide a method for impregnating porous ferrous parts with a cupreous material wherein erosion and other deleterious effects of copper on iron are eliminated through specific steps of the method.

In carrying out the above object, it is still another object of the invention to supply the cupreous impregnant for the ferrous part in a dispersed condition within a non-metallic material taken from the class of refractory materials which do not deleteriously affect the metal with which they are in contact.

A still further object of the invention is to mix the cupreous impregnant for the ferrous part with a refractory material taken from the class including such impalpable powders as silica, aluminum oxide, magnesium oxide, bentonite, china clay, graphite alone or in mixed form, etc.

It is another object of the invention to utilize the refractory material in impalpable form in quantities of from 1 to 6% by weight of the impregnant to be used wherein the cupreous metal is mixed with sufficient ferrous material to satisfy the dissolving action of the cupreous metal for iron and wherein the entire powder mixture is compressed into a self-sustaining mass which can be placed on the ferrous part to be impregnated whereupon such assembly can be heated for effecting the infiltration of the cupreous material into the ferrous part.

It is another object of the invention to provide a method for impregnating ferrous parts with cupreous material wherein pits, channels and other erosion characteristics in the ferrous part are completely eliminated. This is accomplished by providing a self-sustaining mass of the cupreous impregnant metal together with a predetermined quantity of ferrous powder and an impalpable powder of a refractory character completely dispersed through said metallic ingredients and acting as a retainer or sponge for said metals wherein the surface tension of the metals retained therein hold said metals in the molten state within the refractory mass until such time that the cupreous metal has dissolved sufficient of the ferrous metal to satisfy its dissolving action for iron whereupon the molten constituent will pass into the ferrous part to be impregnated.

Still another object of the invention is to provide a method for selectively impregnating ferrous parts with predetermined quantities of cupreous metal wherein induction heating is utilized during the impregnating step.

Further objects and advantages of the present invention will be apparent from the following description, reference being had to the accompanying drawing, wherein preferred embodiments of the present invention are clearly shown.

Figure 1:
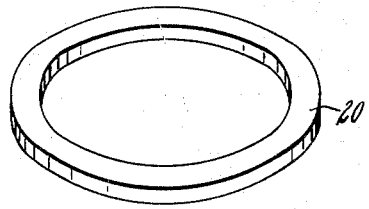
Fig. 1 is a view in perspective of an impregnant ring used in connection with one embodiment of this invention.

A major problem in the impregnation of porous ferrous parts with cupreous metals is to prevent uneven distribution of the cupreous metal as it enters the part and simultaneously to prevent dissolution or erosion of the portions of the ferrous part by the cupreous material.

This is explained by the fact that cupreous metals such as copper and copper alloys have a strong tendency to dissolve iron at a temperature above the melting point of copper. Thus, as the cupreous metal enters the porous ferrous part, dissolution occurs until such time that sufficient iron has been dissolved to satisfy the dissolving action of the cupreous metal for the ferrous part.

In order to alleviate this problem, numerous expedients have been suggested, for example the addition of iron to the cupreous powder as noted in Bourne Patent No. 2,401,221, assigned to the assignee here, and the use of crucibles of ferrous material through which the copper may flow prior to entering the ferrous part as noted in Boyce application, Serial No. 289,271, etc. All of these prior methods have resulted in satisfactory results in the majority of instances. However, in certain cases, particularly where the selective impregnation of a predetermined area of a part is to be carried out while utilizing induction heating, difficulties arise which are difficult to solve when using prior methods. This may be explained by the fact that when induction heating is utilized, the cupreous metal used as an impregnant, reaches its melting point very rapidly and before the temperature of the part to be impregnated is sufficiently high to permit flow of the cupreous metal therein. This causes the cupreous metal in the liquid phase to be present at the surface of the ferrous part for a time sufficient to start erosion unless very critical controls are maintained. The addition of ferrous metal to the cupreous metal in order to satisfy the dissolving action of the cupreous metal for the ferrous part, aids in preventing said erosion to a large measure but, in view of the rapid heating, it is necessary to use a large quantity of said addition preferably in excess of the actual quantity required in order to obtain satisfactory results. Thus, as the cupreous metal is drawn into the ferrous part, the excess ferrous metal added to the cupreous metal impregnant remains on the surface of the ferrous part and due to the specific heating characteristics, tends to bond to the surface of the porous ferrous part, making disfiguring attachments thereon. It is to be understood that if very accurate temperature controls and time periods are maintained, this problem can be substantially eliminated. However, such controls are costly in a production setup and are therefore undesirable.

I have solved the problem in a simple and inexpensive manner wherein all erosion tendencies of the cupreous metal are destroyed, wherein excess ferrous material added to the impregnant prior to the impregnating of the ferrous part, is easily brushed off the surface of the ferrous part after impregnation and wherein induction heating may be used to effect the impregnation. In this connection, it should be pointed out that induction heating is particularly desirable when selective impregnation is being carried out, since it is possible to design the apparatus so as to heat only that portion of the part wherein impregnation is desired. This creates a rapid stop-off of the impregnant and eliminates much of the usual "shading off" thereof often found in furnace impregnation applications. In this instance, the fast stop-off without shading of the impregnant is basically useful as a means for reducing cost in the application since shading off, while not generally undesirable, retains a greater amount of cupreous impregnant which increases the overall cost of the product.

Specifically, my invention is directed to the combination of the cupreous metal such as copper or copper alloys with an impalpable non-metallic powder which does not deleteriously effect the metals involved together with a ferrous metal powder in desired quantities. I have found that magnesium oxide is particularly desirable in this connection, although any refractory powder, such as silica, aluminum oxide, mixtures, etc., will operate satisfactorily for the purpose at hand. The refractory powder is mixed with the cupreous metal powder to be used as an impregnant together with the ferrous metal addition in quantities of from 1 to 6% by weight of the impregnant, whereupon the mixture is compacted into a self-sustaining mass which may be placed on the part to be impregnated.

Referring to the drawings, a ring of the impregnating material is shown at 20 in Fig. 1, which ring may include 6% magnesium oxide, 3½% iron powder and 90½% copper by weight. The metal powders are preferably minus 100 mesh while the magnesium oxide is impalpable in character. This mixture is briquetted at a suitable pressure, for example, in the order of 30,000 pounds to 50,000 pounds per square inch to form a self-sustaining ring 20.

Figure 2:
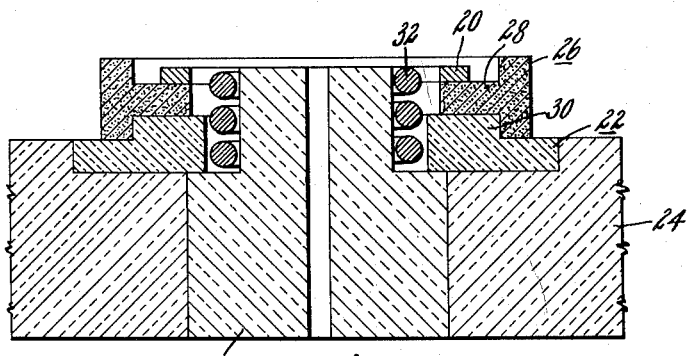
Fig. 2 is a cross sectional view of a portion of an induction heating apparatus used in the selective impregnation of an annular ferrous part wherein said annular part is shown in position with respect to the heating apparatus together with an impregnating ring as shown in Fig. 1.
Figure 3:
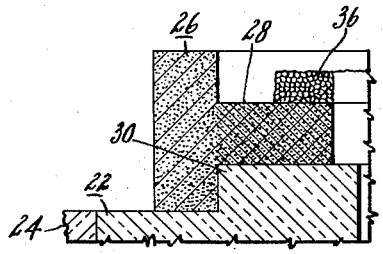
Fig. 3 is a partial sectional view on an enlarged scale of the annular part shown in Fig. 2 after the impregnation thereof.

Referring to Fig. 2, a refractory table 22, supported by a suitable stand 24, holds a sintered porous ferrous metal annulus 26 thereon, which, for purposes of illustration, is the ferrous part to be impregnated. The part 26 may be pure iron or it may be some alloy of iron with or without carbon, etc., the main factor being that said part 26 is porous ferrous material. In the present instance, it is desired to impregnate the inner annular flange 28 thereof only and for this purpose, the part 26 is placed on the table 22 and centered thereon by means of a shoulder 30 wherein the inner annular portion of the part 26 surrounds an induction coil 32 in spaced relation thereto. The induction coil 32 is suitably supported upon a core 34. The ring 20 of a cupreous impregnant material as hereinbefore described, is then placed on the annulus 28 of the part 26 in desired position adjacent the portion to be impregnated and the assembly is heated by induction from the coil 32. This causes a heating up of the portion 28 together with a heating up of the impregnant ring 20. In this connection, the ring 20, being of generally lower melting point metal and of less mass, heats more rapidly than the main body of the part to be impregnated and therefore the cupreous portion thereof melts at some point in excess of 1981° F. At this time the copper in the ring 20 commences to dissolve the iron powder mixed therewith in sufficient quantities to satisfy the dissolving action of the copper for iron, the magnesium oxide portion of the ring 20, being of large volume, acts as a sponge or retaining mass and holds this molten constituent, namely the copper and iron within the sponge. This action is aided by the fact that the portion 28 of ferrous part 26 has a surface tension resistance toward impregnation thereof until such time that said part reaches a temperature of 1981° F. or above. At this instant, the surface tension of the molten copper with respect to the porous ferrous part, is reduced and the molten copper is drawn into the selected heated portion of the ferrous part 26 to be impregnated. Since the iron powder originally mixed with the copper powder in the ring 20, has already been partially dissolved by the copper, the inherent dissolving action of copper for iron is already satisfied whereby the copper-iron impregnant, as it passes into the part 26, no longer has an eroding effect thereon. Any excess iron in the original mixture used to make up the ring 20, is retained in the magnesium oxide skeleton and after cooling may be brushed off without leaving any disfigurements or adhering residue on the surface of the part 26.

The quantity of copper may vary according to the extent of impregnation desired in the porous ferrous part. Also, any selected portion of the part may be impregnated by suitable design of the induction heating apparatus as is well known in the art.

It is also manifest that the example given herein is exemplary of one operation and that the impregnant ring 20 may include small quantities of tin or zinc or any other desirable alloying metal. Tin in quantities of 2 to 5% has been found to reduce the surface tension effect to some extent and, for that reason, a small amount of tin is often desirable.

It is apparent that this method, while specifically designed for use in induction heating apparatus, is also useful in connection with furnace heating of parts since it provides an easy method for retaining the impregnant metal in a predetermined quantity and in a predetermined position with respect to the part to be impregnated. Similarly, it prevents sticking of excess ferrous metal to the surface of the part after impregnation is complete. It is apparent also that if a predetermined quantity of the impregnant metal, mixed with the refractory powder, is measured out, this quantity may be placed in powder form upon the part to be impregnated rather than in briquetted condition, although in this case, use of the refractory powder toward the low end of the range is required. This procedure is not usually as desirable as utilizing a briquet, since it is more difficult to weigh out powders than to measure them in a die barrel by volume. Furthermore, it is more difficult to maintain loose powder in a desired position. For these reasons, a briquet of the impregnant metal with the refractory material dispersed therethrough is the preferred procedure.

When utilizing induction heating, graphite is not as useful as one of the non-metallic powders as exemplified by the other materials mentioned and, for this reason, if graphite is used, it is preferred to mix it with one of the other powders.

In all cases, while non-metallic powders in the order of 1 to 6% by weight is a usable range, I prefer to use in the order of 1½% for furnace heating and 2% when induction heating is utilized. Further, it is to be understood that all of the impregnation steps are carried out under non-oxidizing conditions to facilitate the process.

While the embodiments of the present invention as herein disclosed, constitute preferred forms, it is to be understood that other forms might be adopted.

What is claimed is as follows:

1. In the method of impregnating porous ferrous parts with a predetermined quantity of cupreous metal, the steps comprising; mixing a desired quantity of cupreous metal with a quantity of ferrous metal at least sufficient to satisfy the dissolving action of the cupreous metal on iron, together with from 1 to 6% by weight of an impalpable refractory powder placing said mixture of metals and refractory powder upon said ferrous part to be impregnated, heating the part with said mixture thereon to a temperature above the melting point of the cupreous metal in said mixture and below the melting point of iron for a time sufficient to cause said cupreous metal to melt and to dissolve at least a portion of the ferrous metal mixed therewith while said dissolved metal is being retained within the mass of said refractory powder continuing the heating until the molten copper with the iron dissolved therein flows into the ferrous part adjacent said mixture, and finally removing the residue of the said mixture from the surface of said part.

2. In the method of impregnating porous ferrous parts with a predetermined quantity of cupreous metal, the steps comprising; mixing a desired quantity of the cupreous metal with about 3½% by weight of the ferrous metal, together with from 1 to 6% by weight of an impalpable refractory powder consisting of magnesium oxide, placing said mixture of metals and the refractory powder upon said ferrous part to be impregnated, heating the part with said mixture thereon to a temperature of between 2000° F. and 2150° F. for causing said cupreous metal to melt and to dissolve at least a portion of the ferrous metal mixed therewith while being retained within the mass of said refractory powder, continuing the heating until the molten copper with the iron dissolving therein flows into the ferrous part adjacent said mixture, and finally brushing off the residue of said mixture from the surface of said part.

References Cited in the file of this patent

UNITED STATES PATENTS

| | | |
|---|---|---|
| 2,401,221 | Bourne | May 28, 1946 |
| 2,715,589 | Smith | Aug. 16, 1955 |